Nov. 27, 1928.
H. CLEMENT ET AL
1,692,929
OPTICAL TEST CHART
Filed March 24, 1924    4 Sheets-Sheet 2
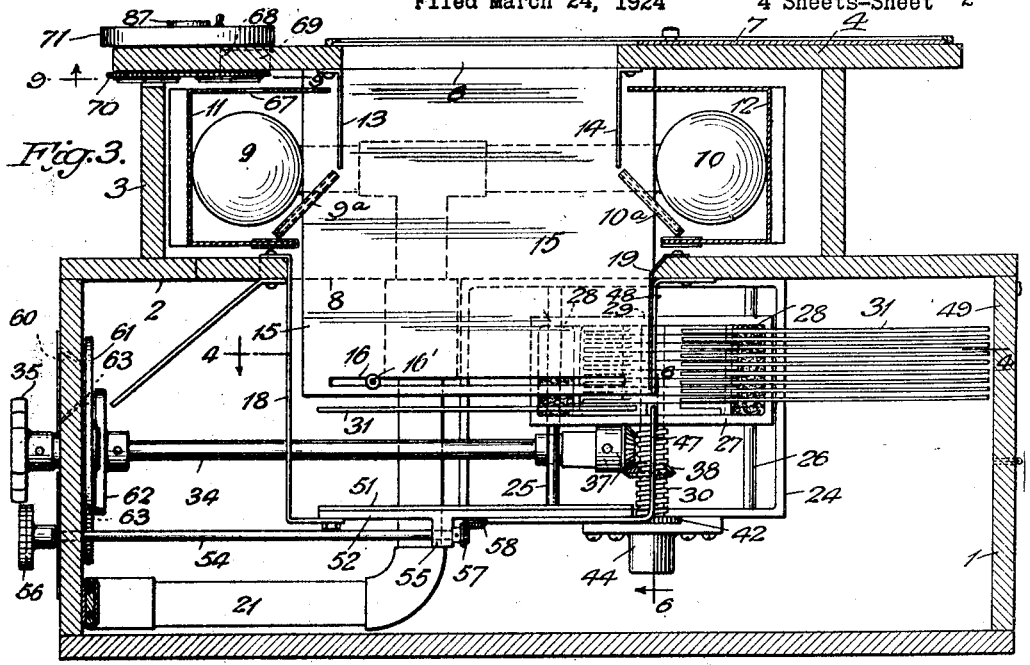
INVENTORS
HANS CLEMENT
ELMER LE ROY RYER
BY
ATTORNEYS

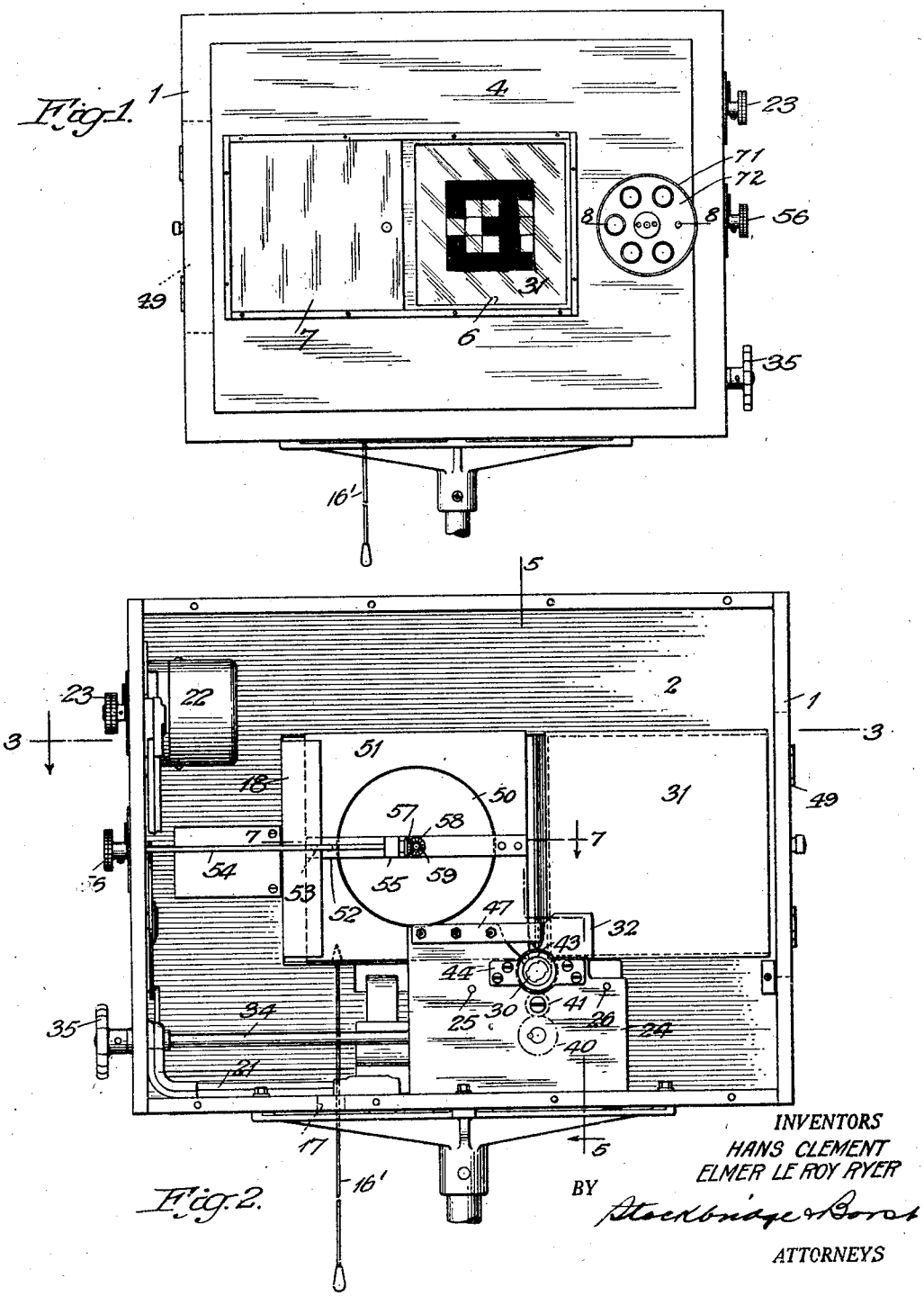

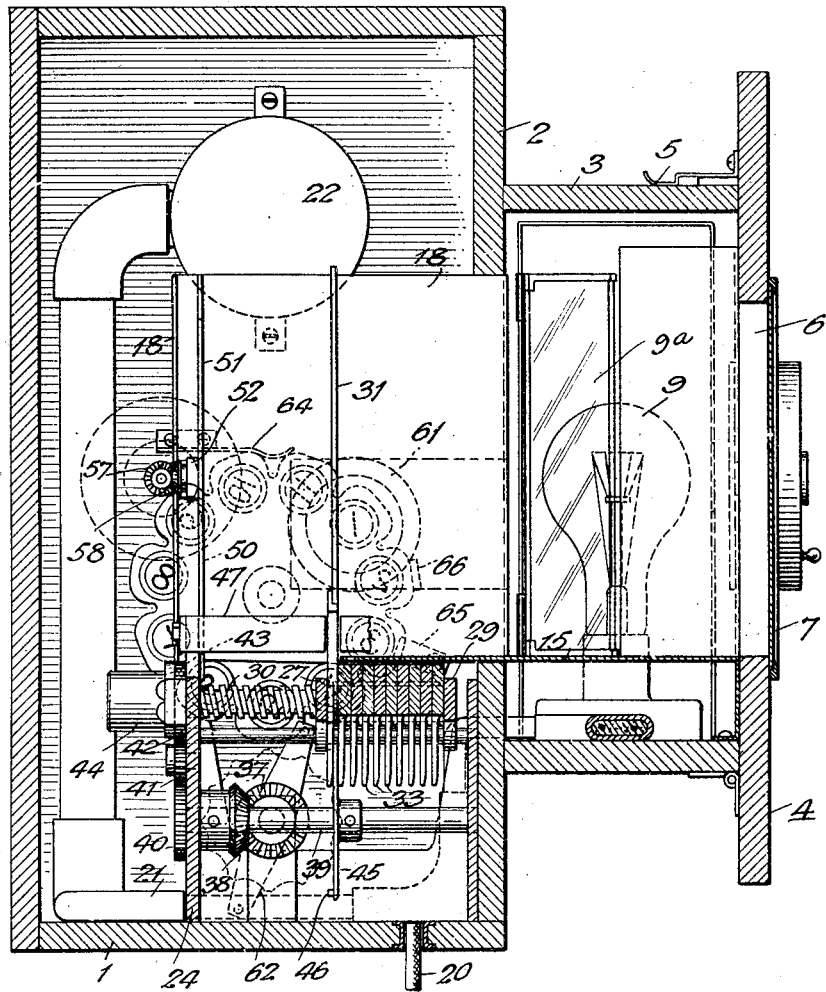

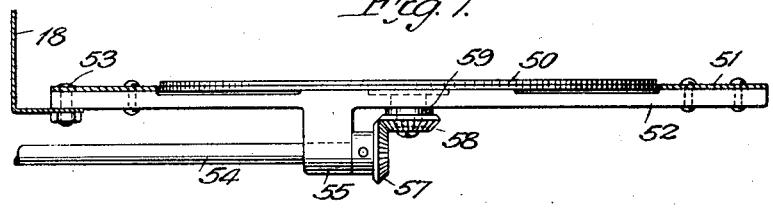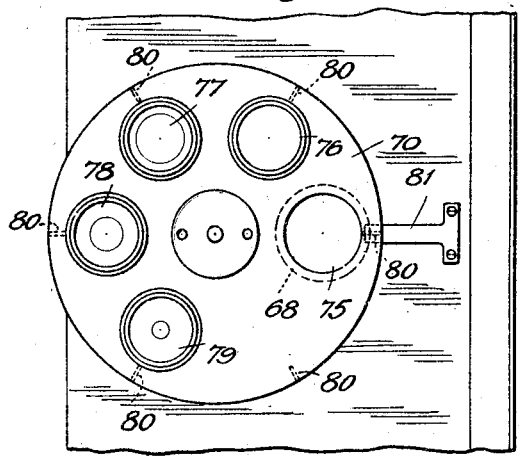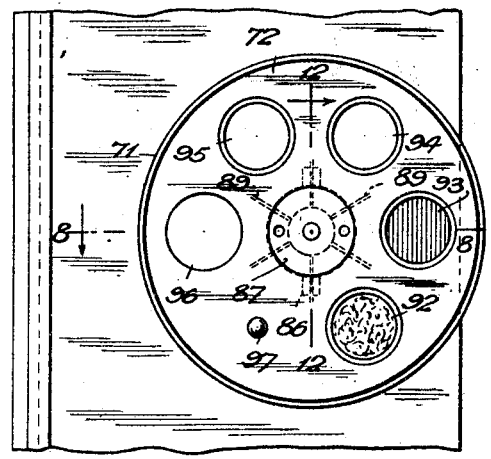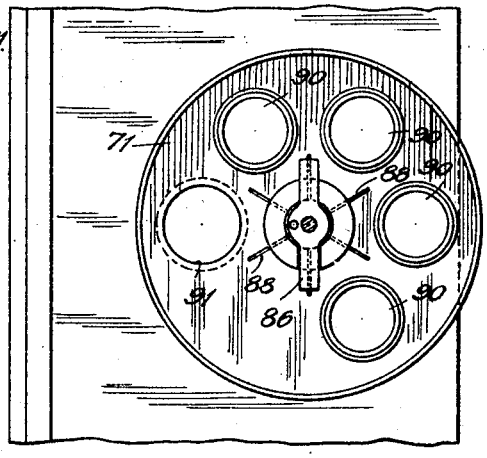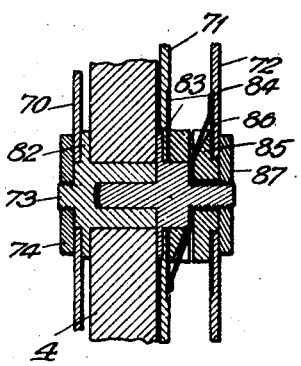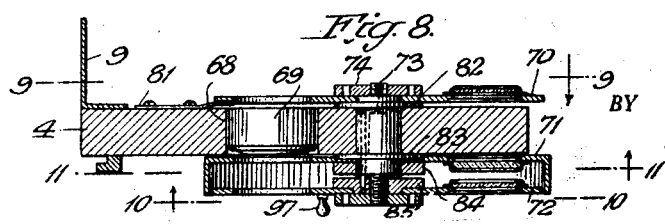

Patented Nov. 27, 1928.

1,692,929

UNITED STATES PATENT OFFICE.

HANS CLEMENT, OF NEW YORK, AND ELMER LE ROY RYER, OF HAWTHORNE, NEW YORK, ASSIGNORS TO GENERAL OPTICAL CO., INC., A CORPORATION OF NEW YORK.

OPTICAL TEST CHART.

Application filed March 24, 1924. Serial No. 701,340.

Our invention relates to test charts such as are used by optometrists in making subjective optical tests to determine the visual acuity of the patient. An object of our invention is to provide a chart for this purpose, which will comply with all the requirements of modern optometry, whether for static or dynamic tests. To this end our invention aims to provide a chart an essential feature of which is to obtain a central fixation on the part of the patient during the examination, and hence our invention contemplates a construction in which only one set of characters are seen at a time through a small opening, and in which each set appears at exactly the same place and in the same plane directly on a horizontal line with the patient's eyes.

Another object is to obtain a proper illumination evenly distributed over the entire surface of any chart in observation position, and to this end our invention contemplates a chart in which the test characters are recessed well back into the casing and the source of illumination is disposed within the casing on one side of the observation opening in such a manner as to illuminate the chart while being concealed from direct view. A more even distribution of the light is obtained by using two bulbs, one on either side of the opening, and preferably daylight blue glass screens ground on one side will be used in order to simulate daylight illumination and to diffuse the light.

Another object is to control the illumination which is especially conducive to fine gradations in determining axis and cylindric power, and in accordance with our invention, we propose to obtain such control of the illumination by means of a variable resistance, such as a rheostat, in circuit with the lamp or lamps employed as the source of illumination.

Another object is to combine with the charts a suitable astigmometer, conveniently operative from the side of the chart casing and so disposed as to be properly aligned within the recessed opening.

Another object is the provision of suitable means for making color and other similar tests and also the provision of a muscle light of variable opening, which may be used alternately with the test characters and which emanates from the same source of light as is employed to illuminate the test characters.

Another object of our invention is to provide a chart which will be readily adaptable to various sized rooms and which may be easily manipulated. Still other objects and advantages of our invention will appear from the following description.

Our invention in its preferred form, comprehends a casing having a front observation opening and provided some distance back in this opening with a partition in which is a corresponding opening. Set well back within the casing, behind the partition is an astigmometer, and between the astigmometer and the partition are a plurality of charts mounted in suitable holders so as to be moved successively into and out of line with the observation opening. One or more lamps are disposed behind the front wall at the sides of the observation openings, screens being arranged so as to shield the lights from direct view, while allowing them to illuminate the charts or astigmometer with an evenly distributed, diffused light. The observation opening may be closed by a shutter, and a translucent hole through the front wall adjacent one of the lamps provides a source of light for color and other screens rotatively mounted on the front wall.

The chart is intended to be used in connection with a reflecting mirror toward which the patient faces. The optometrist stands at one side of the chart, and the operating knobs are hence conveniently arranged on one side of the casing. These knobs include one for operating the charts, one for operating the astigmometer and one for operating the rheostat in series with the lamps. A number disc actuatable in synchronism with the charts also registers with an opening in this side wall and indicates the number of the chart which is exposed.

The operating means for the chart include a carriage which is moved backwards and forward as a chart is brought into or out of line with the observation opening, thereby causing each chart to appear in precisely the same plane.

Our invention also comprehends various other features of construction and arrangements and combinations of parts as will hereinafter more fully appear.

We shall now describe the illustrated embodiment of our invention and shall hereafter point out our invention in claims.

Fig. 1 is a front elevation of a chart construction embodying our invention,

Fig. 2 is a rear elevation of the same on a large scale and with the rear wall removed, Fig. 3 is a sectional plan taken on the line 3—3 of Fig. 2, Fig. 4 is a sectional elevation of the interior part of the mechanism taken on the line 4—4 of Fig. 3, Fig. 5 is a sectional elevation taken on the broken line 5—5 of Fig. 2, Fig. 6 is an enlarged sectional detail taken on the line 6—6 of Fig. 3, Fig. 7 is a sectional detail of the astigmometer with its holder and operating mechanism, taken on the line 7—7 of Fig. 2, Fig. 8 is a horizontal section through the color test and muscle light discs taken on the line 8—8 of Figs. 1 and 10, Fig. 9 is an inside elevation of the muscle light disc holder, as viewed on line 9—9 of Fig. 8, Fig. 10 is an outside elevation of the outer holder for the discs used in testing color visions, as viewed on line 10—10 of Fig. 8, with the clamping nut removed.

Fig. 11 is an outer face view of the inside holder for the discs used in testing color visions, as viewed on line 11—11 of Fig. 8.

Fig. 12 is an enlarged detail in sectional elevation through all of the three discs shown in Figs. 9, 10 and 11, and the mounting therefor, as viewed on line 12—12 of Fig. 10.

The casing for our improved chart is shown as rectangular in shape, the rear or main portion 1 of which has a front wall or partition 2, extending forwardly from which is a somewhat reduced rectangular section 3 closed by a front wall 4 which is hinged at the bottom to the section 3, as shown in Fig. 5, and is held in closed position by a catch 5 cooperating with a lug on the top wall of the section 3. This front wall 4 has a relatively small rectangular central observation opening 6 adapted to be closed by a slide shutter 7, and the partition or wall 2 has a similar observation opening 8 in line with but somewhat larger than the opening 6.

Two electric light bulbs 9 and 10 are disposed within the section 3 on opposite sides of the opening 6, suitable sockets for their reception being provided on the bottom wall of section 3. Sheet metal housings 11 and 12, respectively, are provided for these lamps and are secured to the bottom wall of the section 3, these housings being open at their inner faces so as to leave the lamps free to illuminate a chart or other test characters back of the opening 8. Daylight blue glass screens, 9ª and 10ª, mounted in holders secured on the inner rear edges of the housings 11 and 12, are disposed at an angle of 45° before the lamps 9 and 10, as shown in Figures 3 and 5. These screens are ground on one side and serve to produce a uniform, even illumination of the test object or chart. By their function as light filters and diffusers they cause the entire field to appear flat and eliminate light striations which the lamp filaments might cause by direct illumination. Sheet metal screens 13 and 14 which are carried by the front hinged wall 4 extend inwardly from the face of this wall in a horizontal plane far enough to screen the rays of light from the lamps from direct view in front of the casing. A bottom plate 15 (Figs. 3 and 5) is secured to the bottom wall of the section 3 and disposed at the height of the bottom of the openings 6 and 8 and extends some distance back through the opening 8 into the casing. Near its rear edge this bottom plate is provided with a longitudinal slot 16 through which, and through the opening 17 in the bottom of the casing a suitable pointer 16' may extend. This pointer has a removable head which prevents the pointer from dropping out of the slot and opening. The pointer can be moved both vertically and laterally to enable the operator to point to any character on the test chart which may be before the openings 6 and 8.

Secured to the vertical side walls of the opening 8 are two rearwardly extending sheet metal side members 18 and 19. The side member 18 extends well back towards the rear of the casing and is turned inwardly at its rear edge for attachment to the support for an astigmometer, as will be later described. The side member 19 extends only part way back, stopping just short of the plane of observation of the charts. These side members 18 and 19, as well as the bottom plate 15, are a deep black so as to reflect no light.

The cord 20 for the wires for the lamp circuit is shown as brought in through a hole in the bottom of the casing 1 and thence enters a conduit 21 for the wires (see Figs. 5 and 2). This conduit is shown as leading through a rheostat 22 on the side wall of casing 1, down along the side wall and then along the bottom of the casing and up through an opening in the wall 2, where it divides and leads to the lamps 9 and 10. The rheostat 22 is operated by a knob 23 on the side of the casing 1, a suitable pointer on the operating shaft cooperating with a stationary graduated dial on the outer face of the side wall of the casing to indicate the foot candle power or lumens per square foot.

Secured on the bottom of the casing 1 is a casting 24 (see Fig. 3) for holding the operating mechanism, which will now be described. This casting 24 is a rectangular frame with its side walls of irregular height, and is disposed directly behind the partition 2. Extending between the front and rear walls of this casting 24 are two guide rods 25 and 26 in a plane slightly below the bottom of the openings 6 and 8. A slidable carriage 27 is guided upon these rods 25 and 26. This carriage is in the form of a more or less rectangular frame as viewed in plan, and is provided along its two sides with channels within which is felt or other cushioning material 28. Through its central axis from front to rear extends a bearing shaft 29 which is continued rearwardly in the form of a screw 30 extending through the rear wall of the frame or casting 24. It is evident therefore that as the screw 30 is fed forwardly and backwardly, the carriage 27 will be moved forwardly and backwardly.

Mounted upon the bearing shaft 29 are the charts and chart holders 31. The chart holders are in the form of rectangular metallic plates with their bottom and side edges turned inwardly to form grooves to receive the cards constituting the charts. In this way the charts may be readily removed to be cleaned or changed. The chart holders are pivoted at one corner on the shaft 29. In the form shown this pivoting is obtained by means of a plate 32 (see Fig. 4) secured to each chart holder on the corner thereof and having an arm or projection 33 extending diagonally out from the corner of the holder. This arm 33 is provided near the corner of the chart holder with a hole which fits over the saft 29, and a portion of the arm which extends beyond the shaft 29 on the opposite side of the chart holder is provided with an open slot. The charts are disposed in this manner, one behind the other on the shaft 29, and manually operated means cooperate with the slotted arms 33 to shift the charts successively into and out of observation position, and at the same time move the carriage 27 so as to bring each chart as it is exposed, within the same plane.

The manually operated means comprise a shaft 34 which has operating means at its inner end and which bears in the side wall of the casing 1 with its other end, a suitable hand wheel 35 being provided on the outer end of the shaft. This shaft 34 bears at its inner end in a standard 36 integral with the frame or casting 24 and has on its inner end a bevel gear 37 (see Figs. 4 and 5) which meshes with the bevel gear 38 on a shaft 39 which bears in the front and rear walls of the frame or casting 24. The bevel gear 38 is secured on the shaft 39 against rotation, and the rear end of this shaft 39 has secured on it a spur gear 40 on the rear face of the frame 24. This spur gear 40 meshes with an idler pinion 41 immediately above it, which in turn meshes with gear wheel 42 on an internal screw threaded sleeve 43 surrounding the screw 30. A T-shaped bracket 44, which is secured to the rear face of the frame 24 serves as a bearing for the sleeve 43 and is also recessed to receive the gear 42.

Also secured on the shaft 39 is a shift lever 45 for the charts. This shift lever has two oppositely extending arms at the outer end of each of which is a lateral pin 46, which pins are adapted to engage in the slots of the arms 33 as the shift lever is rotated and swing the charts to and from observation position in line with the openings 6 and 8.

A guide strap 47 is secured to the top of the rear wall of the frame 24 and is bent to extend forwardly into the space between the positions occupied by the charts in their exposed and non-exposed positions (see Figs. 2 and 3). This strap terminates just short of the plane of a chart in exposed position, and another strap 48 which is secured to the rear face of the partition 2 extends toward the end of the strap 47, terminating sufficiently short thereof to provide a guide slot through which each chart must pass when being shifted from one position to another.

It will now be understood that as the hand wheel 35 is rotated, the rotation of the sleeve 43 through the elements above described, serves to feed the screw 30 and hence the carriage 27 and the charts carried thereby backwardly as the charts are being moved from non-exposed to exposed positions and forwardly as the charts are being moved in the opposite direction. The rotation of the shift lever 45 causes the pins 46 to engage in the slots of the arms 33 and shift the charts as they are brought into the path of the pins 46. The carriage will be in its most forward position when no chart is exposed and will be brought back the distance of one chart as the hand wheel is turned so as to rotate the shift lever 45 in the direction indicated by the arrow in Fig. 4, until that chart is shifted to exposed position. The continued rotation of the hand wheel 35 in that direction will bring the carriage back until the next chart is opposite the slot between the straps 47 and 48, in which position the shift lever 45 will engage the arm 33 of the second chart holder, and will swing that chart over to its exposed position. That movement may be continued until all of the charts are successively exposed, while the reverse movement of the hand wheel 35 will move the carriage forwardly and bring the charts successively opposite the slot between the straps 47 and 48 and will cause them to be successively moved from exposed to non-exposed position. The felt pads 28 in the side channels of the carriage 27 serve as a cushioning stop for the chart holders in their two positions.

It will be observed that the charts swing 90° in their movement, and that they therefore rest upon their side in non-exposed position with the top of the chart adjacent the side wall of the casing 1. In order to facilitate the insertion and removal of cards or charts in the holders 31, a door 49 is provided in this side wall of the casing adjacent the tops of the chart holders in their non-exposed position. When this door 49 is opened, the charts may be readily pulled out from the side guides of the holders, and in this way, the charts may be easily cleaned or changed.

The charts are swung to upright position as they are brought into observation position. We contemplate that our chart construction will be used with a reflecting mirror which will be faced by the patient who will see the reflection of the chart in the mirror instead of looking directly into the chart itself. When so employed the characters on the test charts will be reversed while if the chart is used for direct observation, the characters will be arranged forwardly instead of reversely. It will be apparent that central fixation will be obtained by our chart construction since the characters are observable only through a small opening which is well diaphragmed and well recessed into the chart casing. By our arrangement of charts only one set of characters can be seen at a time and these will always appear in the same plane, which will be the plane of the patient's eyes. It will be readily appreciated that this is much preferable to having the characters at various heights on a large chart, as has been the common practice. As above stated, the bulbs 9 and 10 will preferably be daylight bulbs or will have daylight screens interposed between them and the charts. The use of the two bulbs will cause a more complete and even distribution of the illumination than could well be obtained by a single bulb.

Behind the space occupied by the charts in line with the observation openings 6 and 8, is an astigmometer (see Figs. 3 and 4) disposed in a plane parallel to that of the opening 6. This astigmometer consists of two series of parallel lines crossed at right angles and arranged on the inner face of a disc 50 rotatable through 180°. This disc 50 is framed within a rectangular sheet member 51 which is secured to the lateral flanged back edge of the side member 18 through a cross bar 52. This cross bar 52 is secured by pins at its ends to the framing member 51 and the bar is secured to the flanged end of the sheet member 18 by a screw 53 which passes through the member 18 and through the bar 52 and also through the framing member 51.

The bar 52 serves as a bearing for the operating parts for the astigmometer. A horizontal shaft 54 bears at its inner end in a boss 55 outstanding from the bar 52 and bears at its outer end in the side wall of the casing 1 having a hand knob 56 at its outer end outside of the casing. A bevel gear 57 on the inner end of the shaft 54 meshes with a bevel gear 58 on a stud 59 secured to the center of the disc 50. The rotation of the hand knob 56, therefore serves to rotate the disc 50. A pointer on the shaft 54 outside of the casing cooperates with a dial on the outer face of the side wall of the casing to indicate the angular position of the astigmometer. It will be noted that in the construction shown, the knobs 23, 35 and 56 are all disposed on the same side of the casing. This arrangement affords certain convenience for manipulation, but our invention is not limited thereto, and in fact we also in an alternative construction operate the charts from the front of the cabinet, the number disc in that construction being in the front wall. For the number disc an opening 60 is provided in the wall, either side or front, through which the optometrist may observe the number on a number disc 61 actuated by the shaft 34 in synchronism with the shifting of the charts. This number disc 61 is in the form of a star wheel pivoted on the inner face of the side wall of the casing and provided with a plurality of numbers corresponding to the number of the charts arranged concentrically about its axis so as to be successively exposed through the opening 60. The actuating member for this number disc consists of a two-armed lever 62 secured on the shaft 34 and provided on its outer face with two pins 63 adapted to engage the notches in the periphery of the number disc and thus impart rotation to the number disc. This lever 62 is in all substantial respects like the shift lever 45 for shifting the chart holders. Each complete rotation of the shaft 34 will shift two chart holders and will likewise rotate the number disc two numbers. A flat spring 64 (see Fig. 5) secured on the inner face of the wall of the casing, has its free end bent to snap into the notches in the periphery of the number disc and thus resiliently hold it in adjusted position. A stop member 65 is arranged in position on the wall of the casing to be engaged by a cooperative stop projection 66 on the inner face of the number disc so as to limit the rotation of the number disc in one direction. The various charts will bear numbers which will be arranged according to the arrangement of the numbers on the number disc, and the optometrist is, therefore, instructed by the number exposed through the opening 60 as to which chart is in observation position.

On the drop front 4 at one side of the observation opening 6 and in front of the lamp 9 are arranged devices for making tests of color vision and also for supplying a beam of light of variable cross section for making muscle tests. When these devices are being used the shutter 7 will be closed.

The sheet metal protecting housing 11 for the lamp 9 has in its front wall opposite the filament of the lamp an opening 67 which is in line with an opening 68 in the front wall 4. A collecting lens 69 may be provided in this opening 68. In the arrangement shown, three rotative discs 70, 71 and 72, for holding the color screens or other translucent test devices, are concentrically pivoted on the wall 4. For this purpose a screw stud 73 is provided in the wall 4. This screw stud is shown as composed of two separable parts to enable it to be located in the wall. The disc 70 is secured against the inner face of the wall 4 and rotates upon a smooth portion of the stud 73, being held in place by a nut 74 which screws upon the reduced inner screw-threaded end of the stud 73. This disc 70 is shown as provided with five openings arranged concentrically about the axis of the disc with their center 60° apart, thereby leaving one blank space. The opening 75 is either unoccupied or has a clear glass in it, while in the other four openings are shown muscle light discs 76, 77, 78 and 79, which are substantially opaque except for a translucent center, which translucent center is of varying diameter, being largest in the member 76 and grading down to the smallest in the member 79. Notches 80 on the outer face of the disc adjacent the periphery thereof are arranged in radial line with the centers of the various openings and of the intermediate blank space, which cooperate with a pin on a spring stop member 81 secured to the inner face of the wall 4 to resiliently hold the disc 70 in each adjusted position. The disc 70 is spaced from the inner face of the wall 4 by a collar 82 on the stud 73.

The two discs 71 and 72 are pivoted on the stud 73 on the outer face of the wall 4. The disc 71 is shown as an outwardly open cup member within the flange of which is set the disc 72. The disc 71 bears upon a smooth portion of the stud 73 in front of the wall 4, being slightly spaced from the wall by a collar 83 on the stud 73. A washer 84 fits over the stud in front of the disc 71 and this washer is shown as provided with a forwardly extending pin, as shown in Figure 8, for non-rotatably locking it to the two parts immediately in front of it. In front of the washer 84 the stud 73 is reduced in diameter and is screw threaded, as shown in Figure 12. A second washer 85 fits over this reduced end of the stud. Between the washers 84 and 85 is disposed a flat spring member 86 which has a central opening fitting over the reduced extension of the stud 73 and has two oppositely extending arms, one of which is bent forwardly and the other of which is bent rearwardly. The collars 84 and 85 are provided on their outer and inner faces, respectively, with a radial slot into which the respective arms of the spring 86 engage. These spring arms are long enough so that one bears against the outer face of the disc 71 and the other bears against the inner face of the disc 72 which is disposed on the reduced end of the stud 73 just outside the washer 85. A spanner nut 87 locks all the parts in place. The outer face of the disc 71 is provided with radial notches 88 corresponding in number to the test devices which it carries, and the disc 72 is correspondingly provided on its inner face with radial notches 89. The ends of the spring member 86 have little projections adapted to snap into the notches 88 and 89 and thereby resiliently hold the discs in adjusted positions.

The inner cup-shaped disc 71 and the outer disc 72 are shown as provided with five openings and one intermediate blank space, the centers of which are 60° apart. In the openings of the disc 71, we provide color screens 90 leaving one of the openings 91 clear. In the openings of the disc 72 we provide screens to simulate snow, sleet, fog, etc. The screen 92 may be a frosted glass disc and the screen 93 may be a ribbed glass disc, while the screens 94 and 95 may be smoked glass discs of different degrees of transparency. The opening 96 will be left clear.

The discs 70 and 71 extend beyond the edge of the wall 4 to facilitate their manipulation, while the front disc 72 is provided with a handle or knob 97 to facilitate its manual rotation. When the shutter 7 is open and the charts are being observed, the openings 68 will be closed by arranging the disc 70 so that its blank space is over the opening 68. When it is desired to project a beam of light for making a muscle test of the patient's eyes, the shutter 7 will be closed and the discs 71 and 72 will be rotated to bring the clear openings 91 and 96 in line with the opening 68. The disc 70 may then be rotated to bring the screens 76, 77, 78 and 79 successively into line with the opening 68.

When it is desired to make a test of the patient's color vision, the discs 70 and 72 are turned to bring the clear openings 75 and 96 into line with the opening 68, and the disc 71 may then be rotated to bring the color screens 90 successively into line with the opening 68. Similarly, screens in the disc 72 may be used independently of the screens in the discs 70 and 71 by bringing the openings 75 and 91 into line with the opening 68. It is also evident that if desired the screens of two or more of these discs may be used in conjunction.

While for the purpose of illuminating the charts and astigmometer in the desired manner, the lamps 9 and 10 might have daylight, frosted bulbs, thus dispensing with the screens 9ª and 10ª, such bulbs could not be used for the color and similar tests just described.

It is believed that some further description is desirable as to the manner of operation in use of the above described construction of the optical testing device of the present invention. Such further description relates more particularly to the making of tests under different and successively reduced intensities of illumination of the testing elements employed, such as the charts 31, the astigmometer disc 50, the color screens 90 in the disc 71, etc., together with the improved new results thus obtained. For example, any one of these tests may begin with the testing element illuminated at a maximum substantially uniform high brilliancy. Following this initial test, successive other tests may be made with successive reductions in the luminosity of the test element, but with such lower luminosity maintained at a substantially uniform value for each of the successive tests, so thereby obtaining a final and more precise determination of a complete optical test as to acuity of vision, of form sense, and of color sense.

By these tests it may be determined whether the eye is normal, and if not, then it may be determined with great accuracy just to what extent it is abnormal in these respects and under the varying conditions to which the eyes are commonly subjected in every day use. Such successive reduction in the luminosity or intensity of illumination of these test elements is obtained, as hereinbefore described, by means of the rheostat 22, the shaft or the operating knob 23 of which carries a pointer which cooperates with a graduated dial, which gives the correct indication of the degree of luminosity at which vision fails at the final test.

By thus reducing the illumination on the charts 31, visual acuity as to form sense may be determined. In this way there may be noted the ability of the eye to recognize the test characters and the different appearance of these characters as different lenses are placed before the eye. Such tests under reduced illumination permit finer differentiation to be made between the various lenses that are used in making the tests, so that thereby the proper lens may be prescribed for correcting the refractive optical error.

Also in testing for astigmatism, it has been found that similarly improved results are obtained by similarly reducing the illumination on the astigmometer disc 50 from a maximum high uniform illumination to successive lower degrees of substantially uniform illumination for successive tests. In testing for astigmatism it has been found in many instances that with the normal or relatively high intensity of illumination, several slightly different lenses may appear to give a substantially equal degree of correction. In such case the illumination upon the astigmometer disc may be reduced by operating the rheostat, and so tests made under the resulting reduced illumination. Thus by progressively reducing the illumination of the astigmometer disc the precisely correct lens for correcting the astigmatism can be found.

Similarly, the extent of the illumination of an object has been found to bear a definite relation to the color sense of the eyes. In any case, even with a normal eye, it is of course well known that if the illumination is reduced to a sufficiently low point, all color vision disappears and there only remains the recognition of light and shade. However, many persons have a partial deficiency in their color sense which does not amount to obsolute color blindness as determined by the usual tests heretofore made with good illumination. Such persons may have a deficient color sense under adverse conditions, such as poor illumination, their color sense being insufficient for an accurate recognition of color signals under such unfavorable conditions, whereas if their color sense were normal, the color of the signals would be recognized.

These adverse conditions, such as the dimming of signals or lack of sufficient illumination, frequently occur from numerous well known causes. It is of course important for every one to be able to recognize such signals and particularly so for many whose duties require it. Thus one whose color sense has been tested, as heretofore, with normal or high illumination might fail under less favorable conditions. Therefore, safety requires that the color sense should be tested for sufficiency under conditions of low illumination. Also it has been found as people grow older that sometimes their color sense weakens. Accordingly, from time to time a person should have an accurate color test, such as is provided by the apparatus of this invention.

It is obvious that various modifications may be made in the construction shown in the drawings and above particularly described within the principle and scope of our invention.

We claim:

1. An optical test chart comprising a casing provided with a front observation opening, a chart carriage within the casing movable toward and from the opening, and charts on the carriage shiftable into and out of line with the opening.

2. An optical test chart comprising a casing provided with a front observation opening, a plurality of charts in the casing eccentrically pivoted in a row on a common axis parallel with that of the opening, means for successively swinging the charts on their axis to bring them in one position in line with the opening and in another position out of line with the opening, and a source of light in the casing concealed from direct view and arranged to illuminate a chart in observation position.

3. An optical test chart comprising a casing provided with a front observation opening, a chart carriage within the casing movable toward and from the opening, charts on the carriage shiftable into and out of line with the opening and common operative means for moving the carriage and shifting the charts.

4. An optical test chart comprising a casing provided with a front observation opening, a partition in the casing having an opening registering with the front opening, a plurality of charts back of the partition eccentrically pivoted on a common axis parallel with that of the openings so as to swing in one position in line with the openings and in another position behind the partition out of line with the openings, and manually operative means to operate the charts successively on their axis.

5. An optical test chart comprising a casing provided with a front observation opening, a partition in the casing having an opening registering with the front opening, a plurality of charts back of the partition eccentrically pivoted on a common axis parallel with that of the openings so as to swing in one position in line with the openings and in another position behind the partition out of line with the openings, manually operative means to operate the charts successively on their axis, a source of light between the two openings and at one side thereof arranged to illuminate a chart in observation position, and a shield for concealing the light from direct view.

6. An optical test chart comprising a casing provided with a front observation opening, a carriage in the casing at one side of the line of the opening mounted to slide in a plane normal to that of the opening and including a bearing shaft disposed parallel to the axis of the opening, a plurality of charts pivoted eccentrically on said shaft and each having an operating extension on the opposite side of the shaft, a rotatable chart shifting member adapted to engage the said extensions and shift the charts to and from a position in line with the opening, and means for moving the carriage simultaneously with each chart shifting operation to bring the charts successively into operative relation with the shifting member.

7. An optical test chart comprising a casing provided with a front observation opening, a carriage in the casing at one side of the line of the opening mounted to slide in a plane normal to that of the opening and including a bearing shaft disposed parallel to the axis of the opening, a plurality of charts eccentrically pivoted on said shaft and each having a slotted extension on the opposite side of the shaft, a rotatable chart shifting lever having a pin adapted to engage in the slots of said extension and rotate the charts about the shaft to and from a position in line with the opening, manual means for rotating the shifting lever, and means actuated thereby for simultaneously adjusting the carriage to bring the charts successively into operative relation to the shifting lever.

8. An optical test chart comprising a casing provided with a front observation opening, a carriage in the casing at one side of the line of the opening mounted to slide in a plane normal to that of the opening and including a bearing shaft disposed parallel to the axis of the opening, a plurality of charts eccentrically pivoted on said shaft and each having a slotted extension on the opposite side of the shaft, a rotatable chart shifting lever having a pin adapted to engage in the slots of said extensions and rotate the charts about the shaft to and from a position in line with the opening, a feed screw attached to the carriage, a screw threaded sleeve surrounding the screw and operative when rotated to move the carriage forwardly and backwardly, and manually operative means for simultaneously rotating the shifting lever and the sleeve.

9. An optical test chart comprising a casing provided with a front observation opening and a number opening, a plurality of charts within the casing arranged to be moved successively within the casing into and out of view through said observation opening, a number disc rotatively mounted on the inner side of the casing so as to expose its numbers in succession through the number opening, and manually operative means for simultaneously moving the charts and number disc.

10. An optical test chart comprising a casing provided with a front observation opening and a number opening, a partition in the casing having an opening registering with the front opening, a plurality of charts back of the partition eccentrically pivoted on a common axis parallel with that of the opening so as to swing in one position in line with the observation opening and in another position behind the partition out of line with said openings, a number disc rotatively mounted on the inner side of the casing so as to expose its numbers in succession through the number opening, and manually operative means for simultaneously moving the charts and number disc.

11. An optical test chart comprising a casing provided with a front observation opening, a plurality of charts mounted one behind another within the casing and shiftable independently into and out of line with the opening, a bifurcated pivoted shifting arm on each chart, and manually operative means for engaging within the bifurcation of each arm and rotating the arm upon its pivot to shift the chart.

12. An optical test chart comprising a casing provided with a front observation opening, a plurality of charts disposed in the casing substantially back from the opening, and movable independently into and out of the line of the opening, and movable in a forward and back direction so that the exposed chart is always in the same plane, an astigmometer disc rotatively mounted on a fixed axis in the line of the opening and back of the plane of the charts, a source of light in the casing near the front observation opening, shielding means therebetween, said source being in front of said charts and astigmometer disc, means manually operable outside of the casing for moving said charts from the line of said observation opening, and other means manually operative from outside of the casing for rotating the astigmometer.

13. An optical test chart comprising a casing having a clear observation opening and a translucent opening in its front wall, a plurality of charts in the casing movable into and out of line with the observation opening, an astigmometer disc rotatively mounted upon a fixed axis in line with said observation opening and behind the position of said charts, and adapted to be viewed when the charts are moved aside, a lamp behind the translucent opening, arranged to illuminate said charts and when in observation position, and otherwise said astigmometer disc, for inspection by reflected light, a shield between said lamp and said observation opening, a shutter for closing said observation opening, a rotative holder for transparent test devices mounted upon the front wall of said casing, in front of said translucent opening, adapted to carry test devices in openings therein and to rotate to bringing said devices successively in line with said translucent opening, and having a portion adapted to act as a shutter for said translucent opening.

14. An optical test chart comprising a casing having an observation opening and a translucent opening in its front wall, a plurality of charts in the casing movable into and out of line with the observation opening, a lamp behind the translucent opening arranged to illuminate a chart in observation position, a shutter for the observation opening, and a plurality of coaxially mounted rotative holders for transparent test devices pivoted in front of the lamp so as to bring their test devices successively in line with the translucent opening, each holder being independently adjustable.

15. An optical test chart comprising a casing provided with a front observation opening, a plurality of charts mounted one behind another within the casing and shiftable independently into and out of line with the opening, a bifurcated pivoted shifting arm on each chart, manually operative means for engaging within the bifurcation of each arm and rotating the arm upon its pivot to shift the chart, and means for bringing the manually operative means and the shifting levers successively into operative relation.

16. An optical test chart comprising a casing provided with a relatively small observation opening in the front wall, a plurality of charts movable in the casing substantially back from the opening into and out of line with the opening, two lamps behind the front wall of the casing on opposite sides of the opening, arranged to illuminate a chart in observation position, light controlling shields between said lamps and said observation opening, and a light controlling screen between said lamp and said charts.

17. An optical test chart comprising a casing provided with a relatively small observation opening in the front wall, a plurality of charts movable in the casing substantially back from the opening into and out of line with the opening, two lamps behind the front wall of the casing on opposite sides of the opening arranged to illuminate a chart in observation position, and a daylight translucent screen disposed adjacent each lamp between the lamp and a chart in observation position.

18. An optical test chart comprising a casing provided with a front observation opening and with a pointer opening in the bottom wall, a horizontal plate extending inwardly from the observation opening at substantially the height of the bottom of the opening, a plurality of charts in the casing arranged to be brought successively into view before the observation opening and above the horizontal plate, said plate having a transverse slot for the reception of the pointer disposed directly above the pointer opening in the bottom wall of the casing, and a pointer extending within the casing, through said slot and opening in the bottom wall, whereby the pointer is free to slide laterally and vertically.

19. An optical test chart comprising a casing provided with a plurality of front openings, a plurality of charts disposed in the casing substantially back from one of said openings, and movable independently into and out of the line of the opening, a source of light in the casing adjacent said opening, and out of the line thereof, and in the line of another of said openings, shield means between said light and said first mentioned opening, a shutter for closing said first mentioned opening, a translucent closure for said second mentioned opening, a rotating holder positioned on the front of said casing, and cooperating with said second mentioned opening, transparent test devices in said rotative holder, and means comprising a light control means cooperating with said source of light for controlling the character and intensity of illumination therefrom in accordance with the character of the optical test being made.

20. An optical test chart comprising a casing having a clear observation opening in its front wall, a plurality of charts in the casing movable into and out of line with the observation opening, an astigmometer disc rotatively mounted upon an axis in line with said observation opening, a lamp behind said observation opening arranged to illuminate said charts and said disc, at a substantially uniform high brilliancy for optical tests, and means for reducing the illumination to a lower substantially uniform intensity for a final and more precise determination of an optical test.

21. An optical test chart comprising a casing having a clear observation opening in its front wall, a plurality of charts in the casing movable into and out of line with the observation opening, an astigmometer disc rotatively mounted upon an axis in line with said observation opening, a lamp behind said observation opening arranged to illuminate said charts and said disc, at a substantially uniform high brilliancy for optical tests, and means comprising a rheostat cooperating with said light for reducing the illumination to a variably lower substantially uniform intensity for a final and more precise determination of an optical test.

22. The invention defined in claim 2, in combination with light controlling means cooperating with said source of light for changing the intensity of illumination of said chart substantially between maximum and zero luminosity thereof while maintaining substantially uniform luminosity of said chart for each of said changes in intensity of illumination.

23. The invention defined in claim 5, in combination with light controlling means cooperating with said source of light for changing the intensity of illumination of said chart substantially between maximum and zero luminosity thereof while maintaining substantially uniform luminosity of said chart for each of said changes in intensity of illumination.

24. The invention defined in claim 12, in combination with means comprising a light control means cooperating with said source of light for controlling the character and intensity of illumination therefrom in accordance with the character of the optical test being made.

25. The invention defined in claim 13, in combination with a rheostat connected in circuit with said lamp for controlling the intensity of illumination of said chart and said astigmometer disc so that thereby said intensity may be changed in accordance with the optical test being made.

26. The invention defined in claim 14, in combination with means comprising a rheostat cooperating with said lamp for controlling the character and intensity of illumination therefrom in accordance with the character of the optical test being made.

27. The invention defined in claim 16, in combination with a rheostat connected in circuit with the said two lamps for changing the intensity of illumination of the said chart in observation position substantially between maximum and zero while maintaining substantially uniform illumination thereof for each of such changes so as to enable successive tests to be made with different intensities of illumination of the chart.

28. The invention defined in claim 17, in combination with a rheostat connected in circuit with the said two lamps for changing the intensity of illumination of the chart in observation position while maintaining said illumination substantially uniform for making successive tests upon the successive changes in illumination of the chart.

In witness whereof we hereunto subscribe our signatures.

HANS CLEMENT.
ELMER LE ROY RYER.